Oct. 24, 1939.   C. L. HASLUP   2,177,408
SEAT CONSTRUCTION
Filed June 8, 1938   2 Sheets-Sheet 1
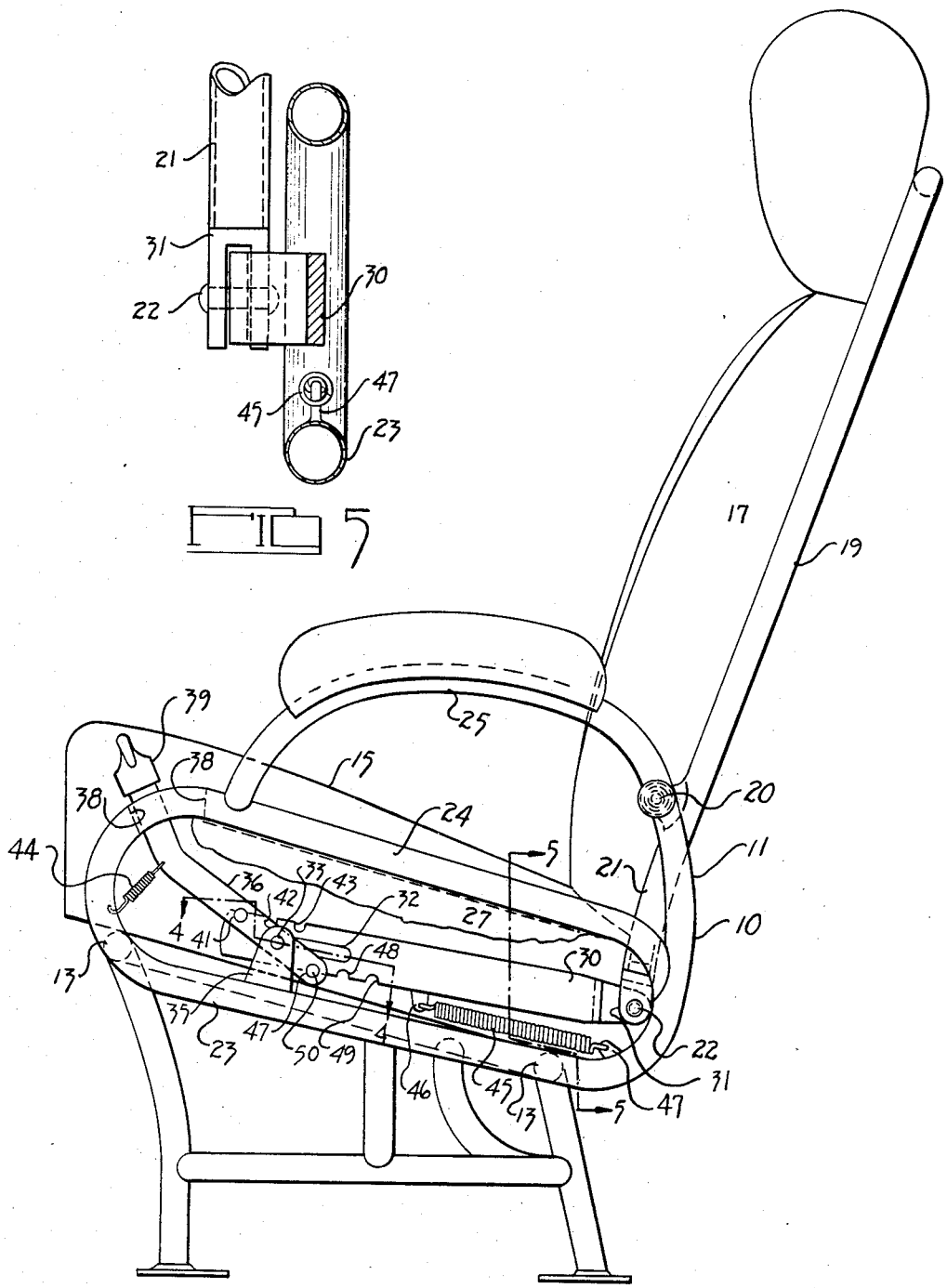
INVENTOR
Clarence L. Haslup
Marechal & Noe
ATTORNEY Oct. 24, 1939. C. L. HASLUP 2,177,408
SEAT CONSTRUCTION
Filed June 8, 1938 2 Sheets-Sheet 2
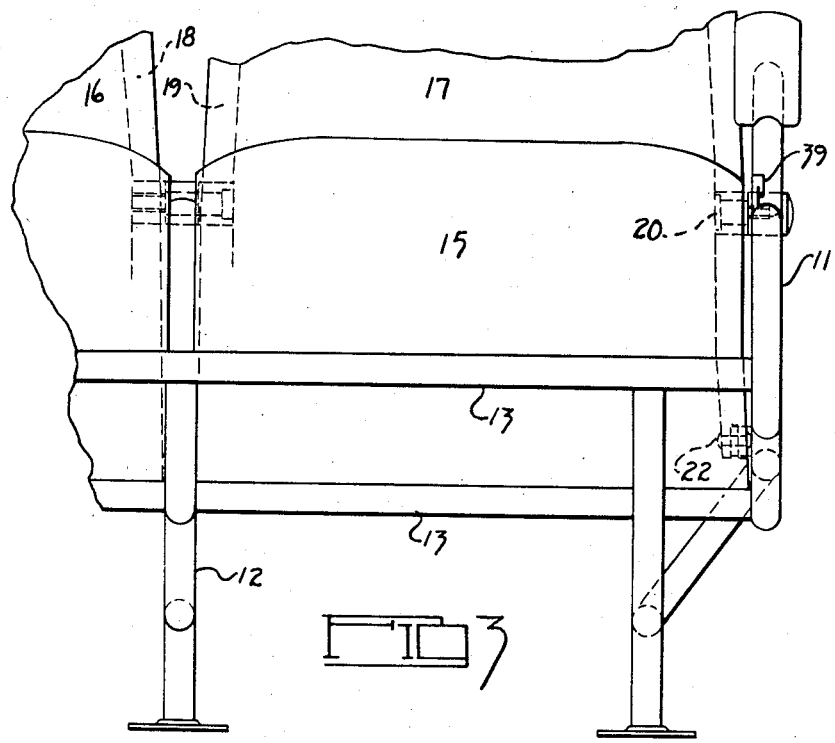
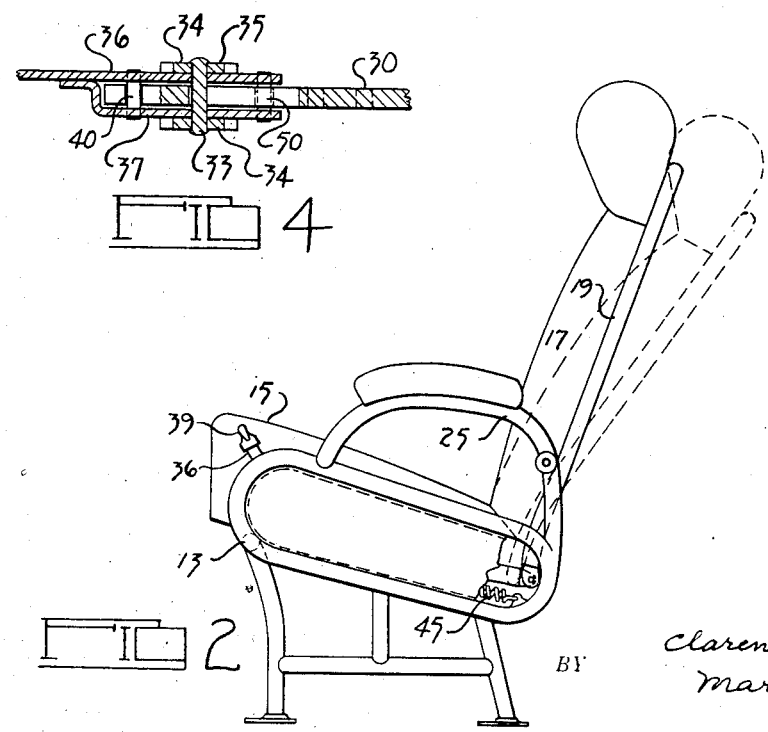
INVENTOR
Clarence L. Haslup
Maréchal & Noir
ATTORNEY Patented Oct. 24, 1939

2,177,408

UNITED STATES PATENT OFFICE 2,177,408

SEAT CONSTRUCTION

Clarence L. Haslup, Troy, Ohio, assignor to The Troy Sunshade Company, Troy, Ohio, a corporation of Ohio Application June 8, 1938, Serial No. 212,402

4 Claims. (Cl. 155—161)

This invention relates to adjustable back seats and adjusting devices therefor.

One object of the invention is the provision of an adjustable back seat having an adjusting device which is simple and cheap in construction and adapted for ready and convenient operation by the occupant of the seat, whereby the back of the seat may be held in any desired inclination that may be most comfortable to the occupant, and enabling the adjustment to be readily changed.

Another object of the invention is the provision of a seat back reclining mechanism incorporating an operating bar capable of moving substantially longitudinally as the inclination of the seat back is changed and having a series of stop means adapted to be selectively engaged by a pivotally movable locking lever, and of such construction that the position of the bar may be securely fixed or readily released by pivotal operation of the lever.

Other objects and advantages of the invention will be apparent from the following description, the appended claims, and the accompanying drawings, in which:

Fig. 1 is a side elevation of an adjustable back seat incorporating the present invention, a portion of the side panel of the seat frame being removed to disclose the operating mechanism;

Fig. 2 is a side elevation of the seat, showing the forward position of the back in solid lines and indicating the rearmost position of the back in dotted lines;

Fig. 3 is a front elevation of the seat, the upper portion of the back being omitted;

Fig. 4 is a section on the line 4—4 of Fig. 1; and

Fig. 5 is a section on the line 5—5 of Fig. 1.

Referring more particularly to the drawings, the numeral 10 generally designates the frame structure of the seat which may be of any suitable construction, but which as herein shown is a double seat such as could be used on buses or trains. The frame 10, as illustrated in Fig. 3, includes side frame members 11, and an intermediate foot structure 12, rigidly interconnected and secured together by transversely extending connection tubes 13. Fig. 3 illustrates a seat cushion 15 and a portion of the seat cushion of the adjacent seat, the side frame 11 of this adjacent seat being omitted as it is similar to the one illustrated. The seat cushions are removably carried by the tubes 13. Two back cushions 16 and 17 are supported on back frames 18 and 19 which are individually mounted on the side frames 11 and on the center leg 12 as by means of pivot bolts 20 so as to swing to different angles of inclination on a horizontal axis. Projecting downwardly and fixed to the back frame 19 is an arm 21 which is connected by a pivot bolt 22 to an adjusting mechanism, housed within the confines of the frame member 11, enabling the angle of inclination of the back to be readily determined by the occupant. A similar adjusting mechanism is provided in the opposite frame member 11 for the back frame 18, the two backs 18 and 19 being individually adjustable.

The side frame 11 is preferably formed of welded hollow steel tubes, including lower and upper tube portions 23 and 24 and a curved arm rest tube 25 on which one of the pivot bolts 20 is arranged. The space between the tube portions 23 and 24 is enclosed on the outer side of the frame by a sheet metal panel plate 27 the edges of which are screwed or welded to the tube portions 23 and 24. This panel 27 covers and protects the adjusting mechanism, the seat cushion itself concealing and protecting the adjusting mechanism on the inner side of the frame.

The adjusting mechanism which is connected to the lower end of the arm 21 comprises an elongated bar 30 which extends forwardly in the space between the tube members 23 and 24. This bar is preferably a flat metal strap having an offset portion at its rear end which is pivotally connected to a lug 31 provided with the lower end of arm 21. The lug forms a mounting for the pivot bolt 22. Near the forward end of the bar 30 the latter is provided with an elongated slot 32, and within the slot is a pivot pin 33, carried by the opposed arms 34 of a bifurcated bracket 35, the lower end of which is bolted or welded securely to the upper side of the tube portion 23. The pivot pin 33 has a diameter fitting within the slot 32 so that movement of the bar 30 in the direction of its length is permitted but preventing any movement of the bar in a direction transversely of the slot. This permits the bar 30 to be moved freely and provides for slight up and down movements of the rear end of the bar as the arm 21 swings.

The pivot pin 33 also carries a releasing and locking lever 36 which includes side straps 37 arranged on opposite sides of the bar 30 and preferably just inside of the arms 34. The pin 33 thus mounts the lever 36 for rocking movement about a fixed axis. The forward end of the lever 36 projects upwardly and forwardly between the outer side of the seat cushion and the inside of the tube member 24, which is somewhat flattened between the points indicated at 38, the lever having a handle 39 arranged at the side of the seat cushion so that it may be conveniently grasped by the occupant of the seat.

In its normal locking position, the lever 36 is arranged as shown in Fig. 1. A coil spring 44 yieldingly holds the lever in locking position, and in this position a stop means such as a pin or projection 40 which extends rigidly between the opposite side straps 37 of the handle is engaged with one of a series of notches on the upper side of the bar 30, as shown, and longitudinal movements of the bar 30 are thus prevented. The upper side of the bar 30 has three notches 41, 42 and 43 which may be selectively engaged by the pin 40 of the lever so as to fix the adjustable back in three different positions of adjustment. The occupant of the seat may adjust the inclination of the back merely by pulling upwardly on the handle 39 so as to disengage the pin 40 from the bar 30, and then by pressing rearwardly on the back he can move the bar forwardly against the action of the spring 45 which is connected at one end to a lug 46 on the bar 30 and at its other end to a lug 47 on the tube portion 23. This brings the notch 42 or the notch 43 beneath the pin 40, and the operator then releases the handle 39 which falls so as to engage the pin 40 with one or the other of these notches.

The lower side of the bar 30 is also provided with notches, designated 47, 48 and 49, and the lever 36 is extended rearwardly and downwardly and is provided with a locking pin 50 which is selectively engageable with the notches 47, 48 and 49, and which is adapted to engage these notches at the same time the pin 40 engages one of the notches in the upper side of the bar. Thus when the pin 40 engages the notch 42 for example, the pin 50 engages the notch 48, and opposite sides of the bar 30 thus held securely and simultaneously by a single locking lever. Any undue force exerted by the occupant on the handle 39 is thus applied in a balanced manner to opposite sides of the bar 30, relieving the pivot pin 33 from unusual strains, the symmetrical locking arrangement also insuring a secure holding of the bar 30 in spite of any play that may be present between the upper and lower surfaces of the slot 32 and the sides of the pivot pin 33. As will be apparent the adjusting mechanism is very simple in construction, embodying simple shapes that may be readily and cheaply made, the construction being such as to relieve the hand lever from the tension exerted by the spring 45 so that the lever may be easily and quickly moved by the occupant to locking or unlocking position.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. In a seat of the character described, a seat frame, a seat on said frame, a back hinged to said frame for movement about a horizontal axis, an adjusting bar pivotally connected to said back and projecting forwardly therefrom, said bar having a plurality of series of notches at opposite sides thereof, means supporting said bar for slidable and tilting movements about a fixed axis, and a locking lever fulcrumed for movement about said axis and having a locking member for each series of notches of the bar for holding said bar in selected positions of adjustment.

2. In a seat of the character described, a seat frame, a seat on said frame, a back hinged to said frame for movement about a horizontal axis, an adjusting bar pivotally connected to said back and projecting forwardly therefrom, spring means normally urging said bar in a direction to move the back forwardly, said bar having a series of longitudinally spaced stop means on a side thereof, and a second series of longitudinally spaced stop means on an opposite side thereof, said bar also having a longitudinally extending slot, a bracket fixed on said frame, a pivot pin carried by said bracket and extending through said slot to hold said bar against movement transversely of said slot, and a pivotally mounted locking lever supported by said pivot pin and having a stop means selectively engageable with the stop means of one of the series of stop means on the bar and also having a second stop means selectively engageable with the stop means of the other series of stop means on the bar to hold the bar against longitudinal movement.

3. In a seat of the character described, a seat frame, a seat on said frame, a back hinged to said frame for movement about a horizontal axis, an adjusting bar conected to said back and projecting forwardly therefrom, spring means normally urging said bar in a direction to move the back forwardly, said bar having a series of longitudinally spaced notches in the upper side thereof and having a second series of longitudinally spaced notches in the lower side thereof and said bar also having a longitudinal slot arranged between the two different series of notches, a bracket fixed on said frame, a pivot pin carried by said bracket and extending through said slot to hold said bar against movement transversely of said slot, and a pivotally mounted locking lever supported by said pivot pin and having a projection adapted for selective engagement with the upper series of notches in the bar and having a second projection adapted for selective engagement with the lower series of notches in the bar, said projections on the lever and said notches on the bar being so coordinated that the lever projections simultaneously engage one of the notches of each of the series on the bar and are simultaneously disengaged from the bar notches by pivotal movement of the lever from a normal position.

4. In a seat of the character described, a seat frame, a seat on said frame, a back hinged to said frame for movement about a horizontal axis, an adjusting bar pivotally connected to said back and projecting forwardly therefrom, spring means connected to said bar and said frame normally urging said bar in a direction to move the back forwardly, said bar having a series of longitudinally spaced notches in the upper side thereof and having a second series of longitudinally spaced notches in the lower side thereof and said bar also having a longitudinal slot arranged between the two different series of notches, a bracket fixed on said frame and having spaced arms extending upwardly on opposite sides of said bar, a pivot pin carried by said bracket and extending through said slot to hold said bar against movement transversely of said slot, and a pivotally mounted locking lever supported by said pivot pin between the arms of said bracket and having a projection adapted for selective engagement with the upper series of notches in the bar and having a second projection adapted for selective engagement with the lower series of notches in the bar, said projections on the lever and said notches on the bar being so coordinated that the lever projections simultaneously engage one of the notches of each of the series on the bar and are simultaneously disengaged from the bar notches by pivotal movement of the lever from a normal position.

CLARENCE L. HASLUP.